US009599879B2

(12) United States Patent
Hirai et al.

(10) Patent No.: US 9,599,879 B2
(45) Date of Patent: Mar. 21, 2017

(54) IMAGE PICKUP APPARATUS EQUIPPED WITH SEMI-TRANSPARENT MIRROR

(71) Applicant: CANON KABUSHIKI KAISHA, Tokyo (JP)

(72) Inventors: Futoshi Hirai, Kawasaki (JP); Hiroyasu Sugihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/145,145

(22) Filed: May 3, 2016

(65) Prior Publication Data

US 2016/0327850 A1 Nov. 10, 2016

(30) Foreign Application Priority Data

May 8, 2015 (JP) ................................ 2015-095591
Sep. 9, 2015 (JP) ................................ 2015-177545

(51) Int. Cl.
*G03B 19/12* (2006.01)
*G03B 11/04* (2006.01)
*G03B 13/08* (2006.01)

(52) U.S. Cl.
CPC .............. *G03B 19/12* (2013.01); *G03B 11/04* (2013.01); *G03B 13/08* (2013.01)

(58) Field of Classification Search
None
See application file for complete search history.

(56) References Cited

U.S. PATENT DOCUMENTS

| 4,508,439 A * | 4/1985 | Ohara | G03B 19/12 396/271 |
| 6,227,726 B1 * | 5/2001 | Higuchi | G03B 19/12 348/E5.028 |
| 2013/0088638 A1 * | 4/2013 | Sakaguchi | H04N 5/2253 348/369 |
| 2015/0043901 A1 * | 2/2015 | Yamada | G03B 19/12 396/358 |

FOREIGN PATENT DOCUMENTS

JP 11-295810 A 10/1999

* cited by examiner

*Primary Examiner* — W B Perkey
(74) *Attorney, Agent, or Firm* — Cowan, Liebowitz & Latman, P.C.

(57) ABSTRACT

An image pickup apparatus capable of reducing unnecessary reflected light without narrowing an exposure area. A holding member holds a semi-transparent mirror and is rotatably supported by a mirror box so as to move between a mirror-down position in a photographing light path and a mirror-up position out of the photographing light path. A shading member is supported on an object-side end of the holding member via a rotation shaft so as to rotate between a closed position close to the holding member and an opened position apart from the holding member. An urging member energizes the shading member toward the opened position when the holding member is in the mirror-down position. An engagement portion engages with the shading member when the holding member rotates toward the mirror-up position so as to rotate the shading member toward the closed position against the urging force.

13 Claims, 12 Drawing Sheets

IMAGE PICKUP APPARATUS EQUIPPED WITH SEMI-TRANSPARENT MIRROR

BACKGROUND OF THE INVENTION

Field of the Invention

The present invention relates to an image pickup apparatus, such as a digital single lens reflex camera, having a semi-transparent mirror that divides object light into an image pickup device and a finder optical system.

Description of the Related Art

There is an image pickup apparatus, such as a digital single lens reflex camera, that allows a part of object light passing through a lens unit transmit a semi-transparent mirror to expose an image pickup unit and reflects the remaining part of the object light to a finder optical system for observation by the semi-transparent mirror.

As such an image pickup apparatus, there is a conventionally proposed technique that rotates a shading member, which is rotatably supported by a holding frame for a quick return mirror including a transflective portion, to a position close to the holding frame by urging force of a toggle spring in a mirror-up state and rotates the shading member to a position apart from the holding frame in a mirror-down state. In this proposal, the toggle spring is hung between a mirror box and the shading member at an object side of the holding frame (Japanese Laid-Open Patent Publication (Kokai) No. H11-295810 (JP H11-295810A)).

However, the technique disclosed in the above-mentioned publication restricts a size of a toggle mechanism including the quick return mirror in order to avoids interference between the toggle spring and a lens at an image-plane side of a lens unit because the toggle spring is projected to the object side at the time when the quick return mirror is in the mirror-down position. Accordingly, since the quick return mirror cannot be enlarged, an exposure area of the object light on the image pickup device is narrow. Moreover, since the toggle spring is exposed to a photographing light path in the mirror-down state as mentioned above, unnecessary reflected light may occur at a time of photographing.

Moreover, a digital single lens reflex camera has a semi-transparent mirror that is arranged in a photographing light path. A part of object light passes through the semi-transparent mirror to an image pickup device that functions as an AE-AF sensor. The remaining part of the light is reflected by the semi-transparent mirror toward an optical finder so as to enable to observe an object. This configuration may cause a problem in that incident light from the finder entering into a mirror box through the semi-transparent mirror enters into the image pickup device and causes flare in the mirror-up state. Although a conventional camera having a sub mirror solves the problem of flare by covering a semi-transparent mirror with the sub mirror in a mirror-up state, a camera without a sub mirror needs to take a new measure.

In order to prevent the flare in the mirror-up state, the above-mentioned publication proposes a configuration that drives a shading member that rotates around a distal end of the holding frame for the quick return mirror to a position close to the quick return mirror in the mirror-up state and drives the shading member to a position apart from the quick return mirror to be retracted from an AF-AE optical path in the mirror-down state.

Incidentally, it is necessary to reserve the transflective portion of the quick return mirror widely in order to enlarge an AE-AF area in the image pickup device in the mirror-down state. On the other hand, the shading member needs to be shaped so as to shade the transflective portion certainly in order to prevent the light from the finder from entering into the image pickup device in the mirror-up state at the image pick-up time. Although the wide transflective portion needs to increase the area of the shading member, such enlargement is difficult because of a space restriction inside the mirror box.

However, although the above-mentioned publication discloses that the holding frame is driven interlocked with the shading member, a concrete relation between the holding frame and the shading member is not described, and details about shading are not analyzed.

SUMMARY OF THE INVENTION

The present invention provides an image pickup apparatus that is capable of reducing unnecessary reflected light in a photographing light path without narrowing an exposure area in an image pickup device for object light passing through a semi-transparent mirror.

Moreover, the present invention provides an image pickup apparatus that is capable of reducing light leakage at an object-side end of a holding frame holding a semi-transparent mirror.

Accordingly, a first aspect of the present invention provides an image pickup apparatus comprising a semi-transparent mirror, a holding member that holds the semi-transparent mirror and is rotatably supported by a mirror box so as to move the semi-transparent mirror between a mirror-down position in which the semi-transparent mirror enters into a photographing light path and a mirror-up position in which the semi-transparent mirror is retracted from the photographing light path, a drive unit configured to rotate the holding member between the mirror-down position and the mirror-up position, a shading member that is supported on an object-side end of the holding member via a rotation shaft so as to rotate between a closed position that is close to the holding member and an opened position that is apart from the holding member, an urging member that is arranged between the holding member and the shading member and that energizes the shading member in a direction to open the shading member to the holding member so as to arrange the shading member at the opened position when the holding member is in the mirror-down position, and an engagement portion that is provided in the mirror box and that engages with the shading member in a vicinity of the rotation shaft when the holding member rotates from the mirror-down position to the mirror-up position so as to rotate the shading member toward the closed position against an urging force of the urging member, and so as to arrange the shading member in the closed position when the holding member reaches the mirror-up position.

Accordingly, a second aspect of the present invention provides an image pickup apparatus comprising a semi-transparent mirror, a holding frame that holds the semi-transparent mirror so as to rotate the semi-transparent mirror between a mirror-down position in which object light is divided into an image pickup device and a finder optical system with the semi-transparent mirror and a mirror-up position in which the semi-transparent mirror is retracted from a photographing light path, and a shading member that is rotatably supported via a rotation shaft provided on an object-side end of the holding member so as to be apart from the semi-transparent mirror when the holding frame is in the mirror-down position and to cover the semi-transparent mirror when the holding frame is in the mirror-up position. A first curved surface that has an approximately arc shape around the rotation shaft is formed in the object-side end of the holding frame. A second curved surface that has an approximately arc shape around the rotation shaft is formed in an object-side end of the shading member. At least a part of the first curved surface overlaps with at least a part of the second curved surface in a direction that intersects perpendicularly with the rotation shaft over the full process of the rotation of the holding frame between the mirror-up position and the mirror-down position.

According to the first aspect of the present invention, unnecessary reflected light in the photographing light path is reduced without narrowing the exposure area in the image pickup device for the object light passing through the semi-transparent mirror.

Moreover, according to the second aspect of the present invention, the light leakage at the object-side end of the holding frame holding the semi-transparent mirror is reduced.

Further features of the present invention will become apparent from the following description of exemplary embodiments with reference to the attached drawings.

BRIEF DESCRIPTION OF THE DRAWINGS

FIG. 12A shows a mirror-down state, and FIG. 12B shows a mirror-up state.

FIG. 15A shows a mirror-down state, and FIG. 15B shows a mirror-up state.

DESCRIPTION OF THE EMBODIMENTS

Hereafter, embodiments according to the present invention will be described in detail with reference to the drawings.

Figure 1:
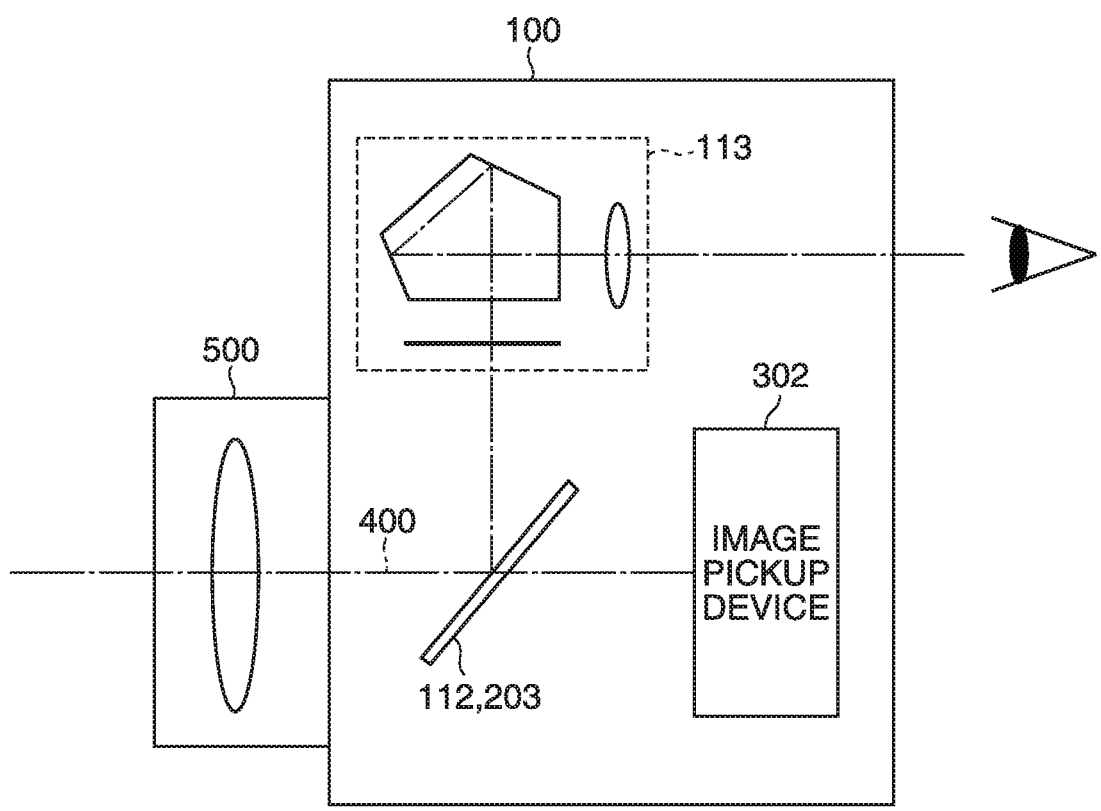
FIG. 1 is a view schematically showing a digital single lens reflex camera as an example of an image pickup apparatus according to a first embodiment of the present invention.

FIG. 1 is a view schematically showing a digital single lens reflex camera as an example of an image pickup apparatus according to a first embodiment of the present invention. Although the single lens reflex camera to which a lens is attachable and detachable is exemplified in the embodiment, the present invention is not limited to this. That is, the present invention is applied to an image pickup apparatus having a semi-transparent mirror that divides object light into an image pickup device and a finder optical system, and a name of the apparatus does not matter.

This camera is configured by attaching an interchangeable lens unit 500 having an optical axis 400 to a camera body 100. A semi-transparent mirror 203 allows transmitting a part of object light passing through a photographing optical system, such as the interchangeable lens unit 500, so as to guide the light to an image pickup device 302. The semi-transparent mirror 203 reflects the remaining object light to a finder unit 113 as a finder optical system so that a photographer is able to observe the object light.

Figure 2A:
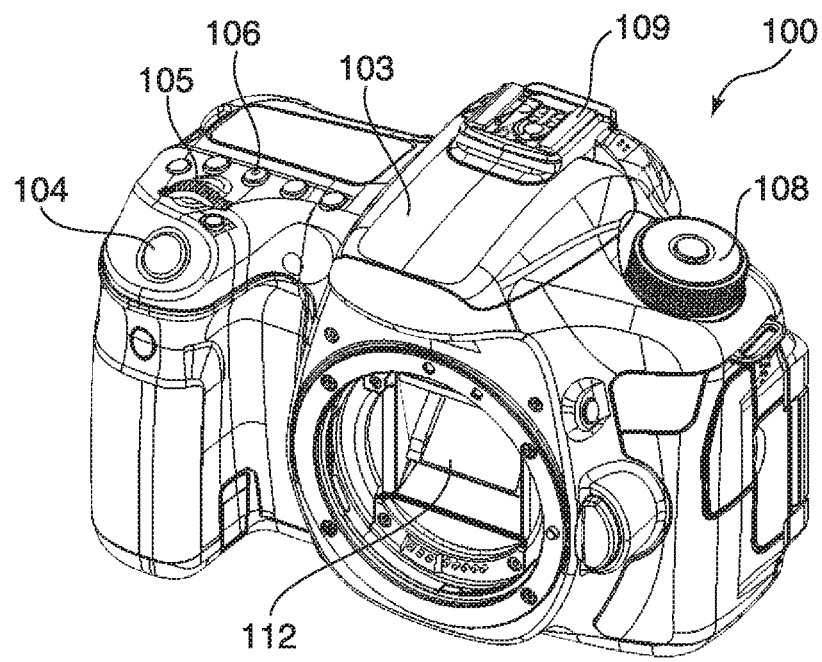
FIG. 2A is a perspective view showing a concrete configuration of a camera body shown in FIG. 1 viewed from a front side.
Figure 2B:
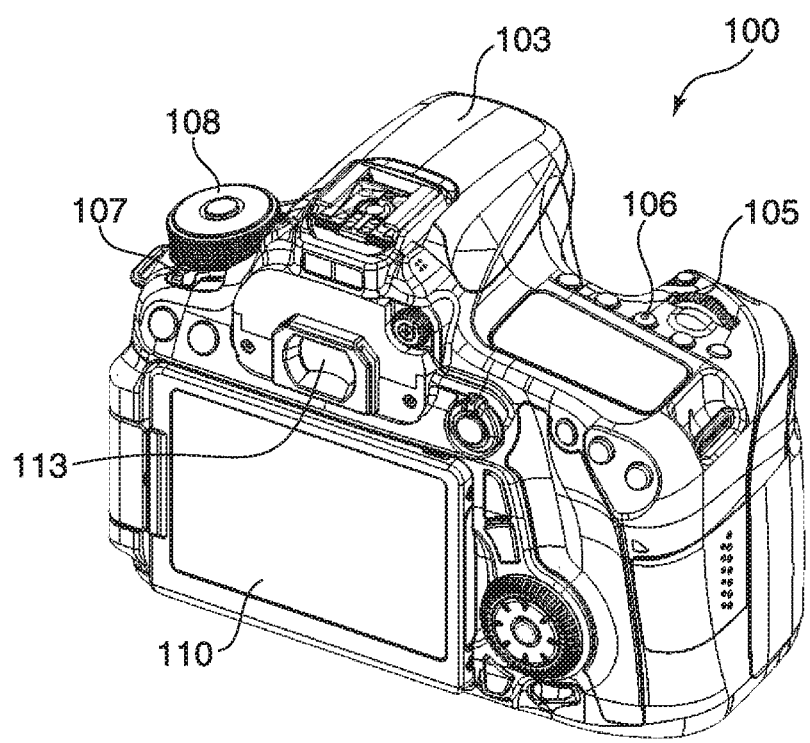
FIG. 2B is a perspective view showing the camera body shown in FIG. 2A viewed from a rear side.
Figure 3:
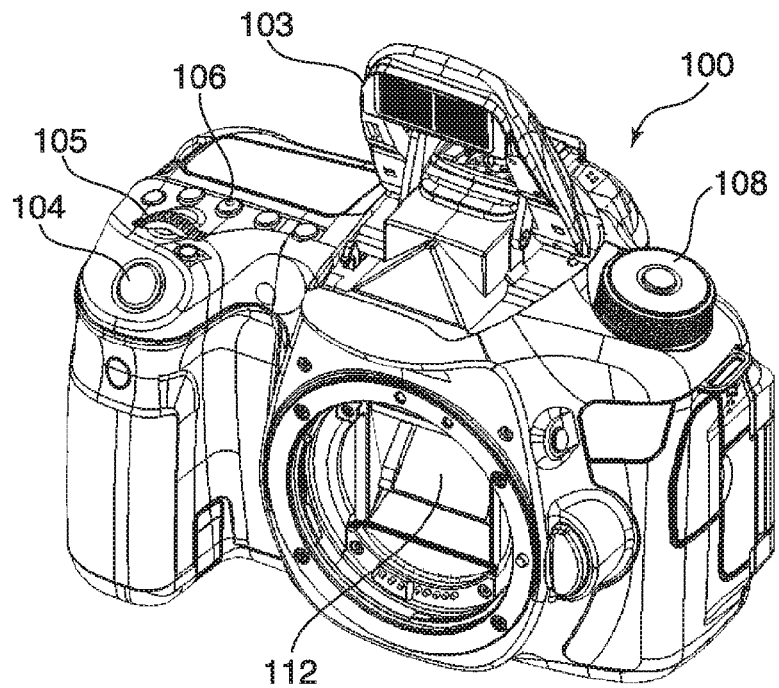
FIG. 3 is a perspective view showing a state where a flash unit of the camera body shown in FIG. 2A is popped up to a light-emitting position.

FIG. 2A is a perspective view showing a concrete configuration of the camera body 100 shown in FIG. 1 viewed from a front side, and FIG. 2B is a perspective view showing the camera body 100 shown in FIG. 2A viewed from a rear side. FIG. 3 is a perspective view showing a state where a flash unit of the camera body 100 shown in FIG. 2A is popped up to a light-emitting position.

As shown in FIG. 2A, FIG. 2B, and FIG. 3, a flash unit 103, release button 104, electronic dial 105, ISO speed setting button 106, power switch 107, mode dial 108, accessory shoe 109, etc. are provided on an upper portion of the camera body 100.

Moreover, a display unit 110, the finder unit 113, etc. are provided on a rear side of the camera body 100. A mirror unit 112 is provided inside the camera body 100. The mirror unit 112 is provided with the semi-transparent mirror 203.

Figure 4:
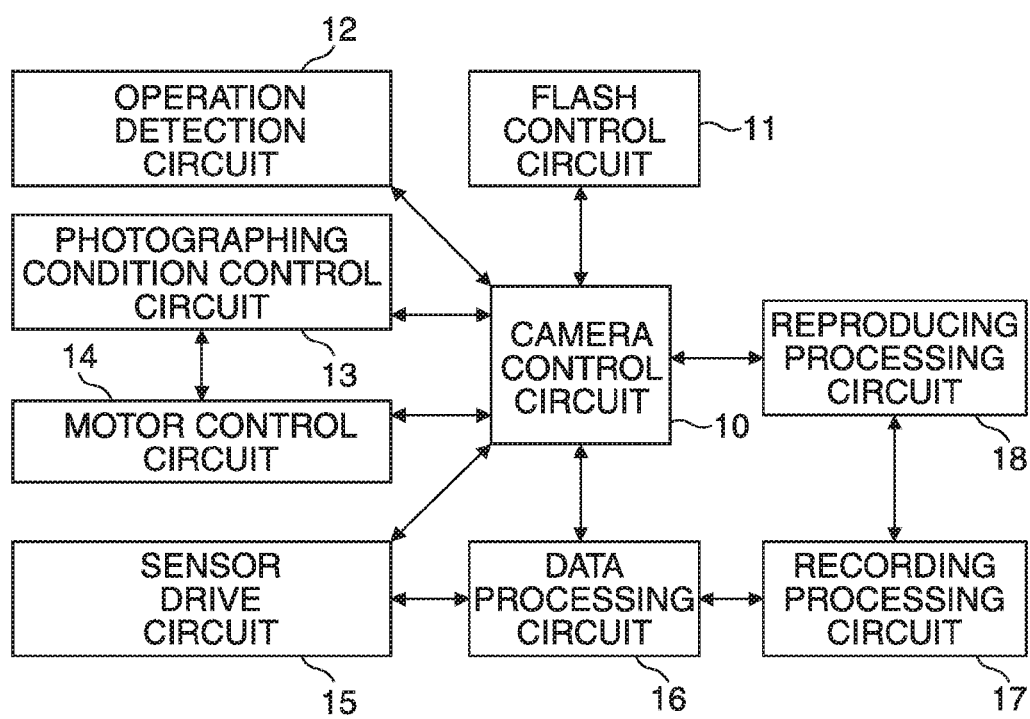
FIG. 4 is a block diagram schematically showing a control system of the digital single lens reflex camera shown in FIG. 1.

FIG. 4 is a block diagram schematically showing a control system of the digital single lens reflex camera shown in FIG. 1.

A camera control circuit 10 in FIG. 4 starts the camera by a predetermined sequence in response to an ON operation of the power switch 107. When an operation detection circuit 12 detects an operation of an operation member, the camera control circuit 10 performs a process corresponding to the detection result.

For example, when the mode dial 108 is operated and a photographing mode is selected, the camera control circuit 10 sets up a program diagram that is used to determine a combination of a shutter speed and an aperture value corresponding to the selected photographing mode. Moreover, when the electronic dial 105 is operated, the camera control circuit 10 performs settings about exposure correction etc. When the ISO speed setting button 106 is operated, an ISO speed condition is set up.

Next, a series of photographing operations when automatic setting mode is selected by the mode dial 108 will be described. When the operation detection circuit 12 detects a half press operation of the release button 104, the camera control circuit 10 drives a photographing condition control circuit 13. Then, the camera control circuit 10 photometers the object light with a photometry sensor (not shown) that is arranged near the finder unit 113 in order to determine a suitable shutter speed and a suitable aperture value. It should be noted that the object light that passes through the semi-transparent mirror 203 and enters into the image pickup device 302 may be measured for photometry.

Next, when the object light is determined to be lower than a predetermined luminance on the basis of the photometry result from the photometry sensor, the camera control circuit 10 controls the motor control circuit 14 to drive a motor (not shown) so as to pop up the flash unit 103 to the light-emitting position (see FIG. 3).

Next, when the operation detection circuit 12 detects a full-press operation of the release button 104, the camera control circuit 10 controls the motor control circuit 14 to drive a motor (not shown) so as to retract the mirror unit 112 from the photographing light path so that the object light fully enters into the image pickup device 302. Moreover, the camera control circuit 10 controls a flash control circuit 11 so as to emit a flash at a predetermined timing to irradiate an object with suitable light.

Next, the camera control circuit 10 controls a sensor drive circuit 15 to drive the image pickup device 302 so as to photoelectrically convert the object light into image data. Then, the camera control circuit 10 obtains the image data and controls a data processing circuit 16 to apply image processes, such as amplification, conversion, and correction, to the image data obtained.

The camera control circuit 10 controls a recording processing circuit 17 to record the image data after the image processes into a memory (not shown). Moreover, when a photographer operates a play button (not shown), the camera control circuit 10 controls a reproducing processing circuit 18 to display an image recorded in the memory onto the display unit 110.

Figure 5:
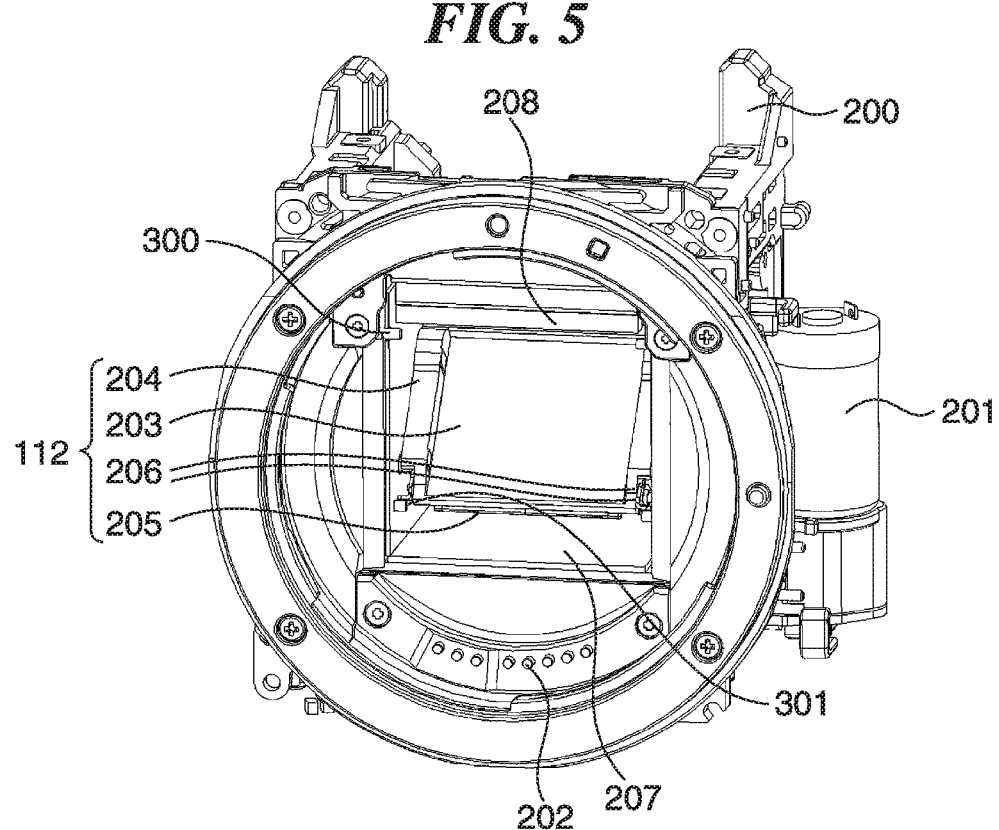
FIG. 5 is a perspective view showing a mirror box of the camera body shown in FIG. 2A.

FIG. 5 is a perspective view showing a mirror box 200 in the camera body 100 shown in FIG. 2A. As shown in FIG. 5, a drive unit 201 that drives the mirror unit 112 is attached to a side of the mirror box 200. The drive unit 201 consists of a motor, gear, drive spring, drive lever, etc.

The finder unit 113 mentioned above is attached to the upper portion of the mirror box 200 (not shown in FIG. 5). Moreover, a holding frame 204 that holds the semi-transparent mirror 203 of the mirror unit 112 is rotatably supported by the mirror box 200. The mirror unit 112 is provided with a shading plate 205 and an urging spring 206 in addition to the semi-transparent mirror 203 and the holding frame 204. The holding frame 204 is equivalent to an example of the holding member of the present invention.

An antireflection sheet 207 for preventing unnecessary reflected light is pasted on the lower part of the inner wall portion of the mirror box 200. It should be noted that antireflection coating, an antireflection structure, etc. may be employed in place of the antireflection sheet 207. Moreover, an impact-absorbing member 208 on which the mirror unit 112 rising up at the time of photographing impinges is provided in the upper portion of the inner wall portion of the mirror box 200. Impact at the time of impingement is moderated because the mirror unit 112 impinges on the impact-absorbing member 208.

Figure 6:
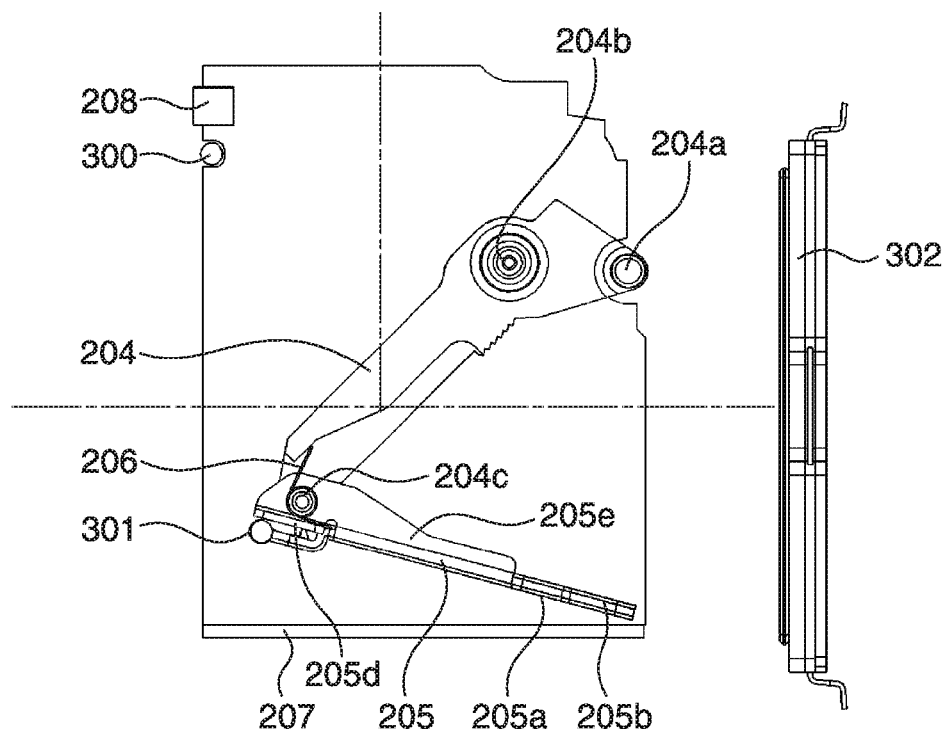
FIG. 6 is a side view showing a mirror unit included in the mirror box shown in FIG. 5 and an image pickup device.

FIG. 6 is a side view showing the mirror unit 112 and the image pickup device 302. As shown in FIG. 6, the holding frame 204 that holds the semi-transparent mirror 203 is supported via a rotation shaft 204a so as to be rotatable between a mirror-down position in which the mirror enters into the photographing light path and a mirror-up position in which the mirror is extracted from the photographing light path.

Moreover, the holding frame 204 is rotatable between the mirror-down position and the mirror-up position and is held in the mirror-down position and the mirror-up position by driving a drive shaft 204b by the drive spring and the drive lever of the drive unit 201. States of the members of the mirror box 200 when the holding frame 204 is in the mirror-down position and the mirror-up position are called a mirror-down state and a mirror-up state, respectively.

The semi-transparent mirror 203 allows to transmit a part of object light passing through the photographing optical system so as to guide the light to the image pickup device 302. The remaining part of the object light is reflected to the side of the finder optical system of the finder unit 113 so that a photographer is able to observe.

An up-position drive pin 300 and a bound preventive pin 301 are provided in the inner side of the side wall of the mirror box 200. The up-position drive pin 300 is equivalent to an example of the engagement member of the present invention, and the bound preventive pin 301 is equivalent to an example of the contact portion of the present invention. Operations of the up-position drive pin 300 and the bound preventive pin 301 will be described later.

The shading plate 205 is provided in a distal end of the object side of the holding frame 204. The shading plate 205 is supported by the holding frame 204 via a rotation shaft 204c so as to be rotatable between a closing position that is close to the holding frame 204 and an opening position that is apart from the holding frame 204. The shading plate 205 is equivalent to an example of the shading member of the present invention.

The urging spring 206 that energizes the shading plate 205 in a direction opening (detaching) from the holding frame 204 is provided around the rotation shaft 204c. The urging spring 206 consists of a torsion spring in this embodiment. The rotation shaft 204 is inserted into a coil portion of the urging spring 206, one end contacts the holding frame 204, and the other end contacts the contact portion 205d of the shading plate 205. The urging spring 206 is equivalent to an example of the urging member of the present invention.

As shown in FIG. 6, when the mirror unit 112 is arranged in the mirror-down position, the shading plate 205 is held in a state to be opened with respect to the holding frame while directing the distal end toward the image pickup device 302 by urging force of the urging spring 206. Since the shading plate 205 has a function to prevent unnecessary light entering from the finder unit 113 from entering into the image pickup device 302 in the mirror-up state, the shading plate 205 should have a width that covers an opening 204f (see FIG. 7B) in which the semi-transparent mirror 203 is provided. Accordingly, the width at the side of the image pickup device 302 (the distal end) is narrower than the width at the side of the rotation shaft 204c (the proximal side). This saves the weight of the shading plate 205.

When the mirror unit 112 is in the mirror-down position, the shading plate 205 prevents the object light from entering into the image pickup device 302 through a gap between the distal end of the holding frame 204 at the object side and the bottom of the mirror box 200. This prevents deterioration of the quality of an image obtained with the image pickup device 302 and prevents influence to the focusing accuracy by shading unnecessary light.

Antireflection sheets 205a and 205b that prevent reflection of unnecessary light at the time of focusing and photographing are respectively pasted on the both (front and back) sides of the shading plate 205. When the mirror unit 112 is in the mirror-down position, the object light that transmits the semi-transparent mirror 203 positioned in the opening 204f of the holding frame 204 enters into the image pickup device 302. At this time, if the shading plate 205 reflected unnecessary light, the imaging quality would deteriorate and the focusing accuracy would be affected. However, the antireflection sheet 205b enables to reduce unnecessary reflected light. It should be noted that an antireflection means, such as an antireflection coating and an antireflection structure (for example, a concavo-convex continuation structure), may be employed in place of the antireflection sheet.

In this embodiment, it is possible to perform a focusing operation by means of contrast AF, image-plane phase difference AF, etc. using the image data output from the image pickup device 302 that converts the object light passing through the semi-transparent mirror 203 into the electrical signal. Accordingly, it is unnecessary to provide a phase difference AF unit under the mirror box 200.

Moreover, since the object light passing through the semi-transparent mirror 203 arranged in the opening 204f of the holding frame 204 enters into the image pickup device 302 and the image data is obtained when the mirror unit 112 is in the mirror-down position, a focusable area is decided by a size of the opening 204f. In this embodiment, the focusable area is not limited. It is preferable that the ratio of the opening 204f to a photographing size is 50% or more to keep a wide focusable range that is user-friendly. Moreover, since the opening 204f of the holding frame 204 becomes larger as the semi-transparent mirror 203 becomes larger, the semi-transparent mirror 203 should become larger as much as possible to be user-friendly for a photographer.

Figure 7A:
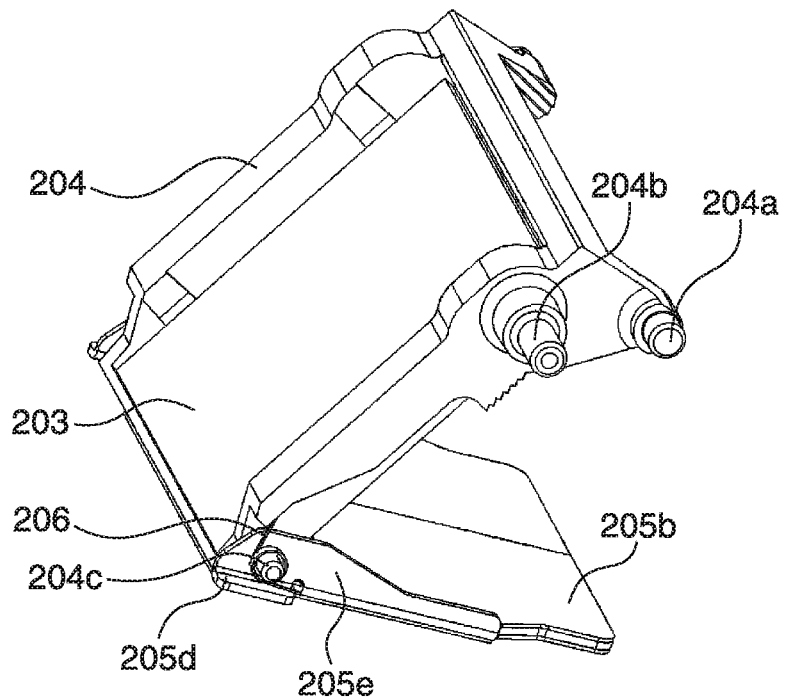
FIG. 7A is a perspective view of the mirror unit shown in FIG. 6 viewed from an object side.
Figure 7B:
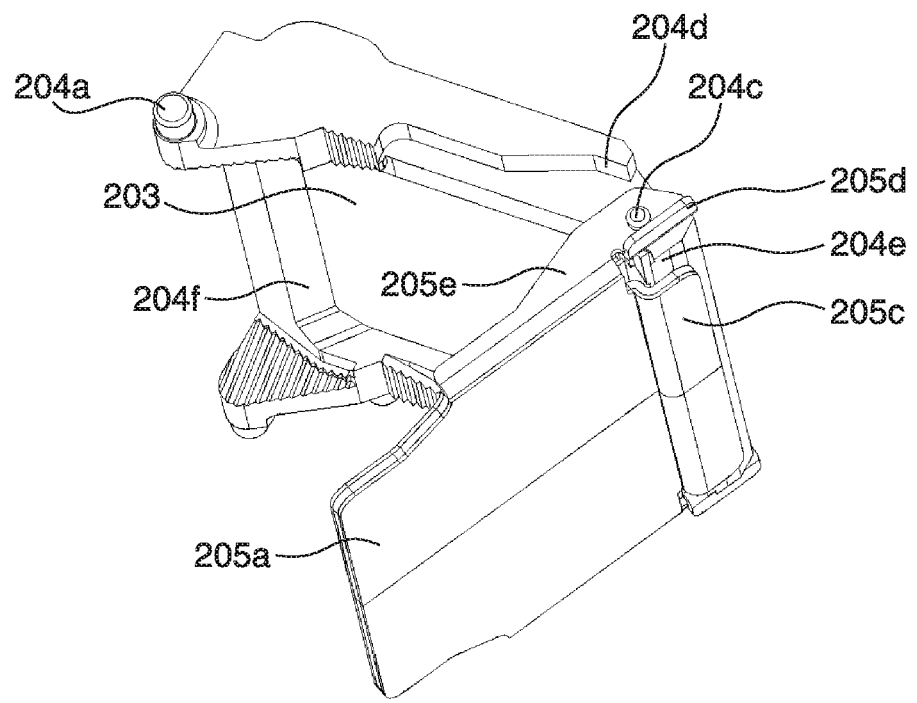
FIG. 7B is a perspective view of the mirror unit shown in FIG. 6 viewed from a side of the image pickup device.

FIG. 7A is a perspective view of the mirror unit 112 viewed from the object side, and FIG. 7B is a perspective view of the mirror unit 112 viewed from the side of the image pickup device 302.

As shown in FIG. 7B, a contact portion 204d that contacts a positioning section 303 (see FIG. 8B) provided in the mirror box 200 is provided on a side of the distal end of the holding frame 204. Since the contact portion 204d of the holding frame 204 contacts the positioning section 303 of the mirror box 200 when the mirror unit 112 is in the mirror-down position, the semi-transparent mirror 203 is held at a predetermined angle.

Moreover, a support portion 204e is provided in the distal end of the holding frame 204. A contact portion 205c provided in the proximal side (the side of the rotation shaft 204c) of the shading plate 205, which is energized in the opening direction to the holding frame 204 with the urging force of the urging spring 206 when the mirror unit is in the mirror-down position, contacts the support portion 204e. Accordingly, since the urging force of the urging spring 206 that acts on the shading plate 205 is received by the contact portion 205c, the opening angle of the shading plate 205 to the holding frame 204 is maintained.

The contact portion 205c of the shading plate 205 is formed by bending in the direction away from the holding frame 204. Accordingly, since the shading plate 205 contacts in the thickness direction of the distal end of the holding frame 204, the distal end of the holding frame 204 is reinforced. The contact portion 205c of the shading plate 205 is not always formed by bending.

The contact portions 205d that can contact the up-position drive pin 300 and the bound preventive pin 301 are provided at both sides of the shading plate 205 in the width direction near the rotation shaft 204c. The contact portions 205d are provided on reinforcing walls 205e that respectively stand at both sides of the shading plate 205 in the width direction in this embodiment. The up-position drive pin 300 is arranged above the contact portion 205d (the side of the finder), and the bound preventive pin 301 is arranged below the contact portion 205d (see FIG. 6).

Figure 8A:
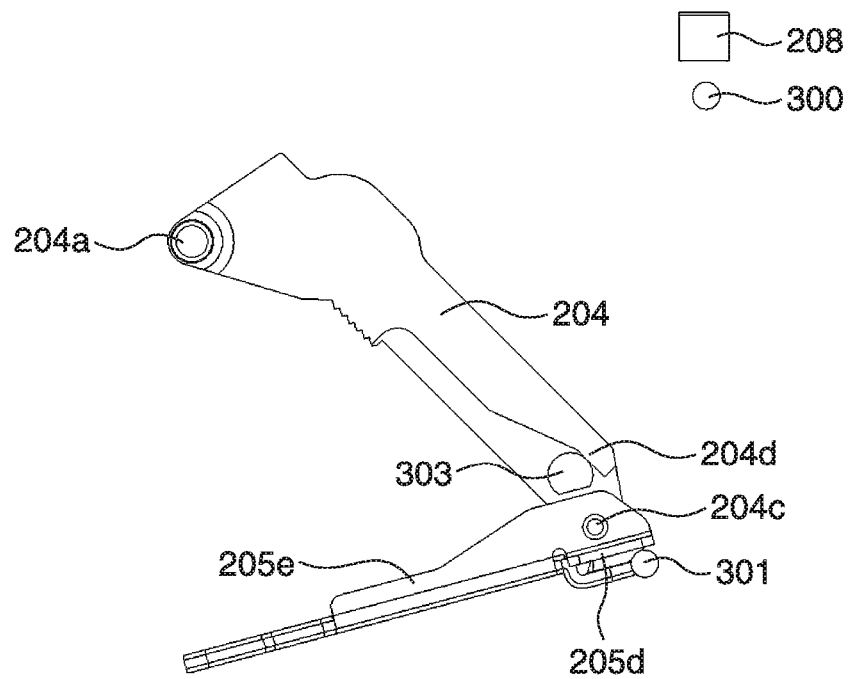
FIG. 8A is a side view of the mirror unit shown in FIG. 6 in a mirror-down state viewed from the side opposite to the viewing side in FIG. 6.
Figure 8B:
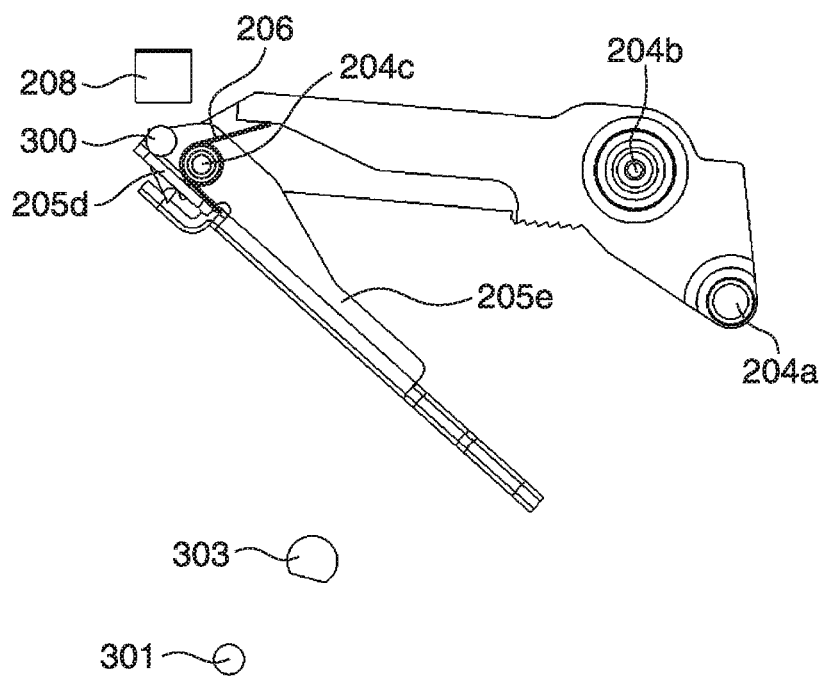
FIG. 8B is a side view showing a state where a contact portion of a shading plate of the mirror unit shown in FIG. 6 contacts an up-position drive pin viewed from the same side as FIG. 6.
Figure 9:
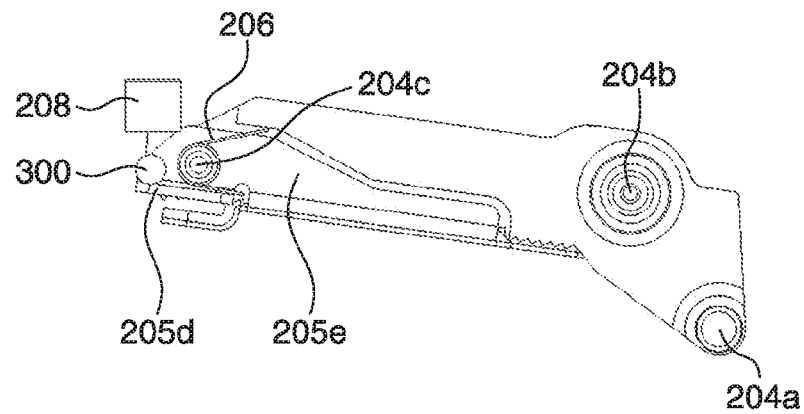
FIG. 9 is a side view of the mirror unit shown in FIG. 6 in a mirror-up state.

Next, an operation of the mirror unit 112 will be described with reference to FIG. 8A, FIG. 8B, and FIG. 9. FIG. 8A is a side view of the mirror unit 112 shown in FIG. 6 in the mirror-down position viewed from the side opposite to the viewing side in FIG. 6, and FIG. 8B is a side view showing a state where the contact portion 205d of the shading plate 205 of the mirror unit 112 contacts the up-position drive pin 300 viewed from the same side as FIG. 6. FIG. 9 is a side view of the mirror unit 112 in the mirror-up position.

In the mirror-down position of the mirror unit 112 shown in FIG. 8A, the holding frame 204 is held while keeping a predetermined angle in a state where the contact portion 204d contacts the positioning section 303 of the mirror box 200. At this time, the contact portion 205d of the shading plate 205 is positioned above the bound preventive pin 301 with a slight gap so as to be able to contact. Then, when bound occurs in the mirror unit 112 in the mirror-down position, the contact portion 205d contacts the bound preventive pin 301, which reduces the bound of the mirror unit 112.

In the state shows in FIG. 8A, a part of the object light passing through the photographing optical system of the lens unit transmits the semi-transparent mirror 203, and enters into the image pickup device 302. The remaining part of the object light is reflected by the semi-transparent mirror 203 to the finder optical system. Accordingly, a photographer is able to observe an object through the finder optical system.

The object light entering into the image pickup device 302 is converted into an electrical signal. When the release button 104 is pressed by half, the camera control circuit 10 performs the above-mentioned focus control and photographing condition setting. After the photographing is allowed, the drive shaft 204b of the holding frame 204 is driven by the drive unit 201, and the holding frame 204 starts a rotational operation toward the mirror-up position together with the shading plate 205.

Then, as the holding frame 204 rotates toward the mirror-up position, the contact portion 205d of the shading plate 205 contacts the up-position drive pin 300, and the state shown in FIG. 8B is exhibited. At this time, the contact portion 205d of the shading plate 205 contacts the up-position drive pin 300 at the object side than the rotation shaft 204c of the shading plate 205. Moreover, the shading plate 205 receives torque in the direction closing (approaching) to the holding frame 204 from the up-position drive pin 300 against the urging force of the urging spring 206. Accordingly, the shading plate 205 rotates in the closing direction to the holding frame 204.

When the holding frame 204 further rotates toward the mirror-up position, the distal end of the holding frame 204 contacts the impact-absorbing member 208, and the holding frame 204 is held in the mirror-up position as shown in FIG. 9. At this time, the shading plate 205 is held in the state closed to the holding frame 204 by the up-position drive pin 300.

After the mirror unit 112 reaches the mirror-up position, the image pickup device 302 obtains image data (exposure). At this time, the shading plate 205 is held in the position to cover the semi-transparent mirror 203 provided in the opening 204f of the holding frame 204 in the state to close to the holding frame 204, which prevents unnecessary light from the finder optical system from entering into the image pickup device 302. Moreover, the antireflection sheet 205a pasted on the shading plate 205 reduces the reflection caused by the unnecessary light that passed through the photographing optical system of the lens unit. This enables to reduce unnecessary light entering into the object light during the exposure of the image pickup device 302.

When the holding frame 204 rotates toward the mirror-down position by the drive unit 201 after the exposure of the image pickup device 302, the shading plate 205 approaches the photographing optical axis together with the holding frame 204. Accordingly, the shading plate 205 begins to separate from the up-position drive pin 300, and rotates in the opening direction so as to separate from the holding frame 204 according to the urging force of the urging spring 206.

When the mirror unit 112 rotates to the mirror-down position and the mirror unit 112 bounds, the contact portion 205d of the shading plate 205 contacts the bound preventive pin 301 as mentioned above, which prevents bound of the shading plate 205. It should be noted that the bound preventive pin 301 is not always provided in a case where bound of the shading plate 205 of the mirror unit 112 is small.

Figure 10:
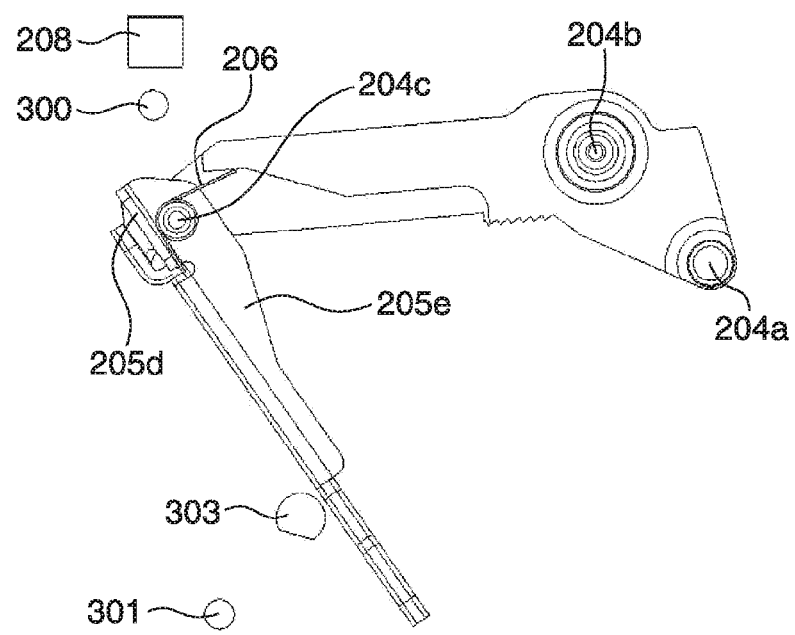
FIG. 10 is a side view for describing a position of the mirror unit shown in FIG. 6 in a state where a power switch of the digital single lens reflex camera is turned OFF.

FIG. 10 is a side view for describing a position of the mirror unit 112 in a state where the power switch 107 of the camera 100 is operated to turn OFF.

When the power switch 107 is operated to turn OFF, the camera control circuit 10 controls the motor control circuit 14 to rotate the mirror unit 112 to the vicinity of the mirror-up position, and then makes the power of the camera 100 turn OFF according to a predetermined sequence. In order to locate the mirror unit 112 in the vicinity of the mirror-up position, the drive lever and the driving cam of the drive unit 201 should be stopped in a predetermined phase. For example, a predetermined phase during a mirror-down operation or a predetermined phase during a mirror-up operation may be employed.

When the camera control circuit 10 turns OFF the power of the camera 100 in the state where the mirror unit 112 is positioned near the mirror-up position, the holding frame 204 is positioned near the mirror-up position, and the shading plate 205 separates from the holding frame 204 as shown in FIG. 10. That is, it is possible to stop the mirror unit 112 in the state where the shading plate 205 entered into the photographing light path. Even if the photographing lens is carelessly directed to sunlight, the shading plate 205 shades sunlight, which enables to prevent direct incidence of sunlight to the shutter unit (not shown) or the image pickup device 302.

As described above, in the first embodiment, since the urging spring 206 that energizes the shading plate 205 hangs between the holding frame 204 and the shading plate 205, the urging spring 206 does not projected to the object side during the rotation of the semi-transparent mirror 203 between the mirror-up position and the mirror-down position. This does not require taking interference between the urging spring 206 and the lens of the lens unit located at an image-plane side into consideration. Moreover, when the semi-transparent mirror 203 has rotated to the mirror-up position, the urging spring 206 is never exposed to the photographing light path. Accordingly, unnecessary reflected light in the photographing light path is reduced without narrowing the exposure area in the image pickup device 302 for the object light passing through the semi-transparent mirror 203.

Next, a digital single lens reflex camera as an example of an image pickup apparatus according to a second embodiment of the present invention will be described. It should be noted that the configuration of the first embodiment shown in FIG. 1 through FIG. 4 is common with the second embodiment. Hereinafter, a member that is identical or equivalent to the member of the first embodiment will be described by attaching the same reference number.

Figure 11:
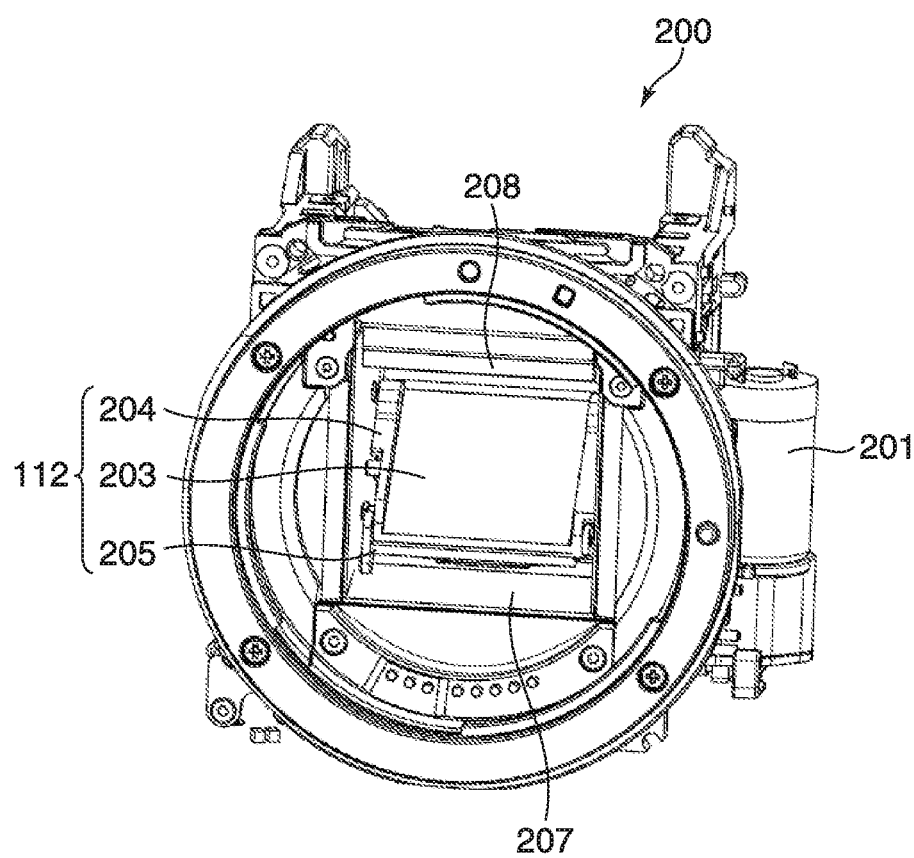
FIG. 11 is a perspective view showing a mirror box of a digital single lens reflex camera concerning a second embodiment of the present invention.

FIG. 11 is a perspective view of a mirror box 200 of the digital single lens reflex camera according to the second embodiment of the present invention. A mirror drive unit 201 that drives a mirror unit 112 is fixed to a side of the mirror box 200. The mirror drive unit 201 consists of a motor, gear, drive spring, drive lever, etc. A finder unit 113 (see FIG. 1) is fixed to an upper portion of the mirror box 200. The mirror unit 112 that reflects a part of object light toward the finder unit 113 consists of a semi-transparent mirror 203, holding frame 204 for the semi-transparent-mirror, shading plate 205, and urging toggle spring 206 mentioned later (see FIG. 13A). The semi-transparent mirror 203 is fixed to the holding frame 204 with adhesive. A well-known antireflection sheet 207 is pasted on an inner wall of the mirror box 200 to prevent unnecessary reflected light. It should be noted that an antireflection structure, such as antireflection coating, may be employed in place of the antireflection sheet 207. An elastic member 208 is fixed to an upper end of an opening of the mirror box 200. The mirror unit 112 contacts the elastic member 208, when it arrives to a retracted position. The elastic member 208 is made from elastic materials, such as sponge and rubber, and moderates impact at the time of the mirror unit 112 is driven to the retracted position.

Figure 12A:
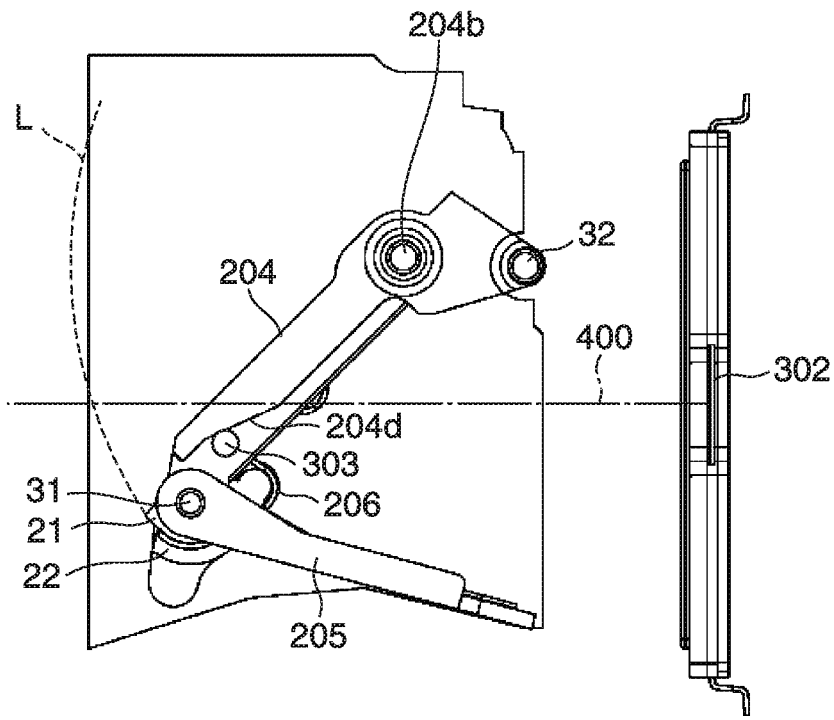
FIG. 12A and FIG. 12B are side views showing a mirror unit included in the mirror box shown in FIG. 11 and an image pickup device.
Figure 12B:
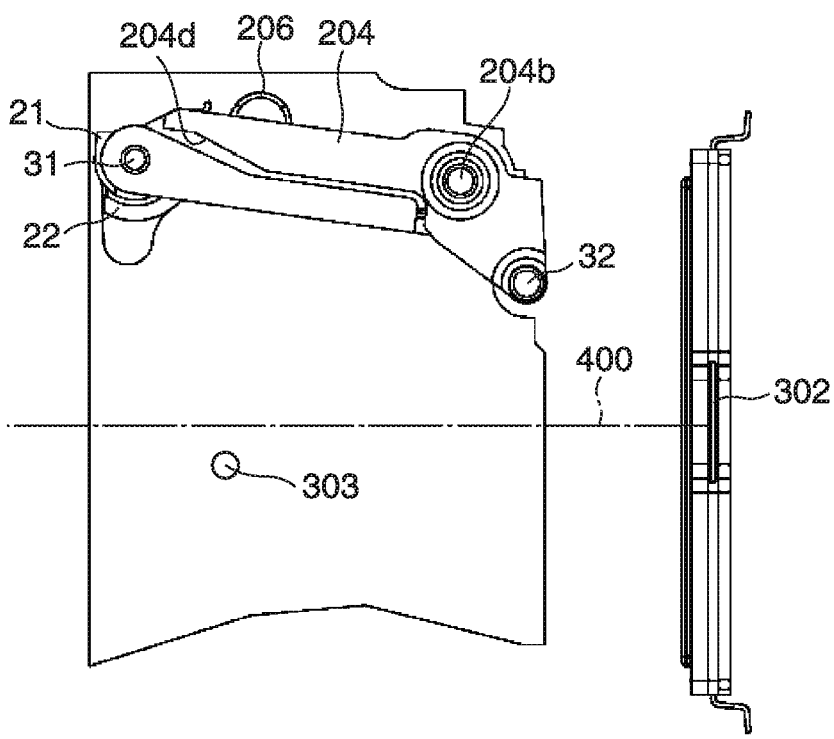

FIG. 12A and FIG. 12B are side views showing the mirror unit included in the mirror box 200 and an image pickup device 302. The holding frame 204 to which the semi-transparent mirror 203 is fixed is rotatable between a mirror-up position shown in FIG. 12A and a mirror-down position shown in FIG. 12B around a holding-frame-rotation shaft 32. The holding-frame-rotation shaft 32 is supported by the mirror box 200. The mirror-down position is selected when a photographer observes object light. The semi-transparent mirror 203 divides the object light into the image pickup device 302 and the finder unit 113 in the mirror-down position. The mirror-up position is selected when the photographer takes a picture. The holding frame 204 is extracted from the photographing optical axis 400 in the mirror-up position.

The holding frame 204 rotates between the mirror-down position and the mirror-up position by driving a drive shaft 204b with a mirror-unit-drive lever and a mirror-unit-drive spring (not shown). The holding frame 204 is held stably in the mirror-down position and the mirror-up position. The shading plate 205 is made from resin of lightweight and high strength in order not to affect an operation of the mirror unit 112. An upper side of each of the semi-transparent mirror 203 and the shading plate 205 in the mirror-up position (FIG. 12B) is referred to as a front side, and a lower side is referred to as a back side. Accordingly, the back side of the semi-transparent mirror 203 faces the front side of the shading plate 205 in the mirror-up position. Antireflection sheets are pasted on the front and back sides of the shading plate 205 to reduce unnecessary reflected light at the time of focusing and photographing. It should be noted that the antireflection feature of the shading plate 205 is not limited to the sheet. Antireflection coating or a geometrical feature for antireflection may be employed.

A shading-plate-rotation shaft 31 used as the rotation center for the shading plate 205 is provided in an object-side end 21 of the holding frame 204. The shading plate 205 is rotatably supported by the shading-plate-rotation shaft 31. Accordingly, the shading plate 205 rotates relatively to the holding frame 204 around the shading-plate-rotation shaft 31. The shading plate 205 rotates in connection with the rotation of the holding frame 204 around the holding-frame-rotation shaft 32. A mirror positioning contact surface 204d that contacts a mirror positioning member 303 that is provided in an inner surface of the mirror box 200 is provided on the side surface of the holding frame 204. The mirror-down position of the holding frame 204 is defined by the contact between the mirror positioning member 303 and the mirror positioning contact surface 303. Accordingly, the semi-transparent mirror 203 held by the holding frame 204 is maintained at a predetermined angle. The shading plate 205 is energized by the urging toggle spring 206 in a direction opening from the holding frame 204 in the mirror-down state, and is energized in a direction closing to the holding frame 204 in the mirror-up state as mentioned later.

The image pickup device 302 can also perform a focusing operation by means of contrast AF, image-plane phase difference AF, etc., which are well-known techniques, using the obtained image data, and can perform an AE operation at the same time. In this embodiment, since the AE-AF operation are performed in the mirror-down state, the shading plate 205 is driven and rotated to the position retracted from an AE-AF optical path of the object light passing through the semi-transparent mirror 203 in the mirror-down state. Moreover, in the mirror-up state at the time of photographing, the shading plate 205 is rotated to the position extracted from the photographing light path, and is located so as to face and overlap the back side of the holding frame 204.

Figure 13A:
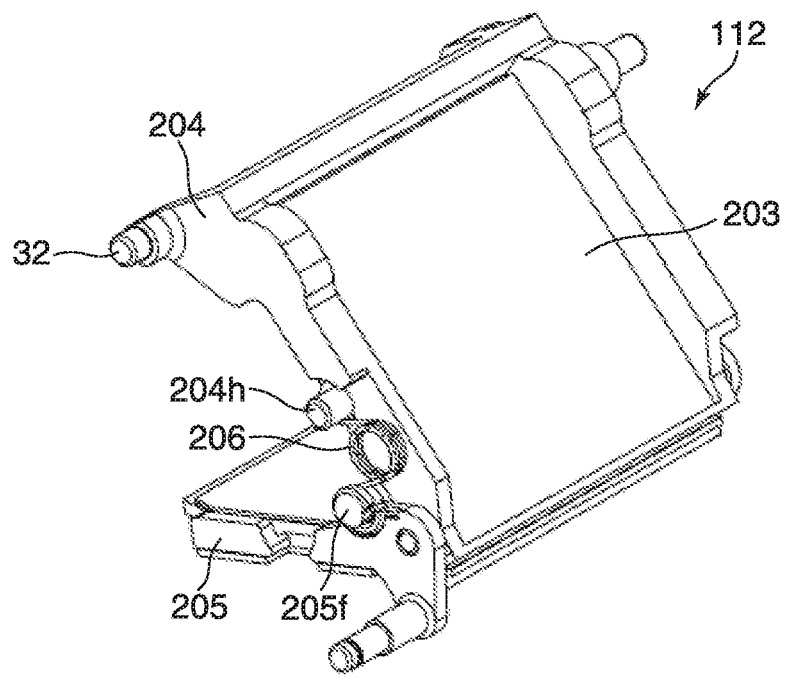
FIG. 13A is a perspective view of the mirror unit shown in FIG. 12A viewed from an object side.
Figure 13B:
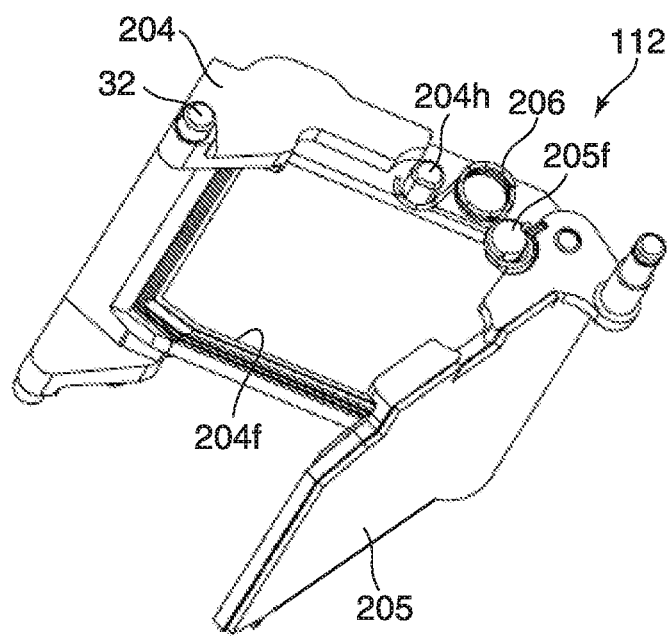
FIG. 13B is a perspective view of the mirror unit shown in FIG. 12A viewed from the side of the image pickup device.

FIG. 13A is a perspective view of the mirror unit 112 shown in FIG. 12A viewed from the object side, and FIG. 13B is a perspective view of the mirror unit 112 shown in FIG. 12A viewed from the side of the image pickup device. One arm of the urging toggle spring 206 is engaged with a spring hanging shaft 204h of the holding frame 204 and the other arm is engaged with a spring hanging shaft 205f of the shading plate 205. The urging toggle spring 206 energizes the spring hanging shafts 204h and 205f so as to keep away from each other. The urging toggle spring 206 energizes the shading plate 205 in a direction opening from the holding frame 204 in the mirror-down position. However, the distance between both the arms of the urging toggle spring 206 decreases and then increases in the process during which the holding frame 204 rotates from the mirror-down position to the mirror-up position, and the upper and lower positional relationship of the spring hanging shafts 204h and 205f is reversed. When the holding frame 204 reaches the mirror-up position, the shading plate 205 faces the holding frame 204, and the urging toggle spring 206 energizes the shading plate 205 in a direction closing to the holding frame 204.

The holding frame 204 has an opening 204f. In the mirror-down position, the image pickup device 302 receives the object light passing through the semi-transparent mirror 203 provided in the opening 204f. The output from the image pickup device 302 is used for the AE-AF operation. Since the transmitting area of the object light is restricted by the opening 204f, the area that allows the AE-AF operation on the image pickup device 302 is determined according to the size of the opening 204f.

Figure 14A:
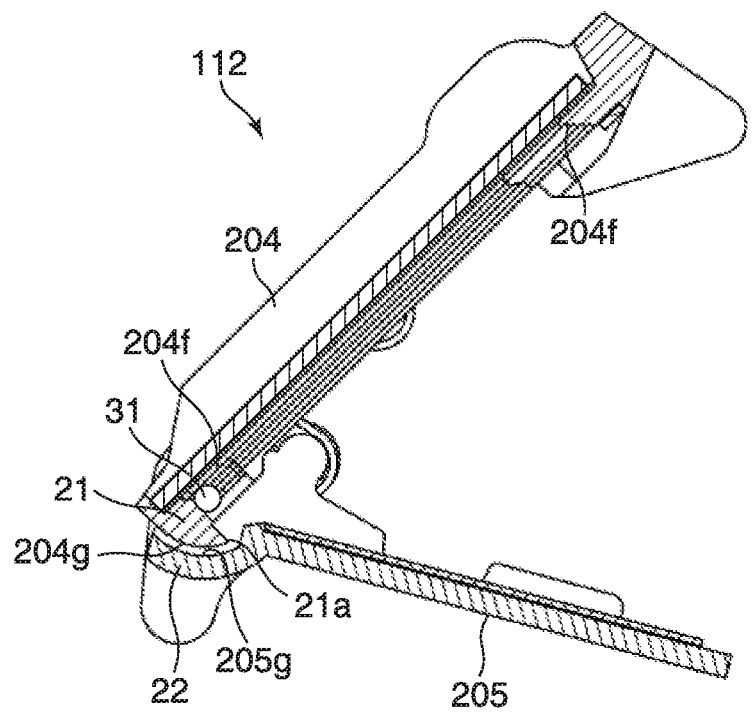
FIG. 14A is a longitudinal sectional view of the mirror unit shown in FIG. 12A in the mirror-down state.
Figure 14B:
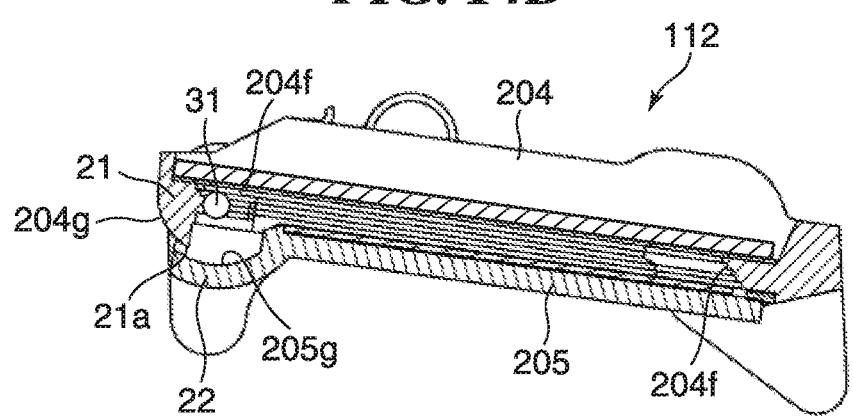
FIG. 14B is a longitudinal sectional view of the mirror unit shown in FIG. 12A in the mirror-up state.

FIG. 14A is a longitudinal sectional view of the mirror unit 112 shown in FIG. 12A in the mirror-down state, and FIG. 14B is a longitudinal sectional view of the mirror unit 112 shown in FIG. 12A in the mirror-up state. Each of the holding frame 204 and the shading plate 205 has a shading configuration at the object-side end. Specifically, the object-side end 21 of the holding frame 204 and the object-side end 22 of the shading plate 205 collaborate to achieve a shading function that reduces light leakage near the end 21 of the holding frame 204. This will be described in detail.

The end 21 of the holding frame 204 has an extended portion 21a that is extended to the back side in the thickness direction of the holding frame 204. The extended portion 21a increases the cross section of the end 21, which improves the strength of the end 21. A first curved surface 204g that has an approximately arc shape around the shading-plate-rotation shaft 31 is formed in the end 21. The first curved surface 204g is a convex curve in a side view. A second curved surface 205g that has an approximately arc shape around the shading-plate-rotation shaft 31 is formed in the end 22 of the shading plate 205. The second curved surface 205g is a concave curve in a side view. The first curved surface 204g and the second curved surface 205g are formed on the approximately concentric circles around the shading-plate-rotation shaft 31 of which radii are different with each other, and both the surfaces face across a predetermined gap.

Over the full process during which the holding frame 204 rotates between the mirror-down position and the mirror-up position, at least a part of the first curved surface 204g always overlaps with at least a part of the second curved surface 205g in the direction (normal line direction) that intersects perpendicularly with the shading-plate-rotation shaft 31. That is, in the mirror-down state (FIG. 14A), the curved surfaces 204g and 205g face in a wide area. Even in the mirror-up state (FIG. 14B), the overlap area where the curved surfaces 204g and 205g face with each other is reserved. In the mirror-down state (FIG. 14A), it is preferable that the image pickup device 302 receives only the light passing through the opening 204f of the holding frame 204 along the AE-AF optical path. It is not preferable that the image pickup device 302 receives reverse-entering light from the finder unit 113. Shading near the end 21 of the holding frame 204 becomes certain because the curved surfaces 204g and 205g face and overlap with each other in the normal direction of the shading-plate-rotation shaft 31. Accordingly, unnecessary light that affects the AE-AF operation is shaded in the mirror-down state.

In the mirror-up state (FIG. 14B), the shading plate 205 is positioned at the back side of the holding frame 204 and shades in order to prevent the light from the finder unit 113 passing through the opening 204e of the holding frame 204 from entering into the image pickup device 302. Since the overlap of the curved surfaces 204g and 205g prevent the leakage of unnecessary light entering from the finder unit 113 from the vicinity of the end 21 of the holding frame 204, incidence of unnecessary light into the image pickup device 302 is prevented.

The curved surfaces 204g and 205g are on approximately concentric circles. Moreover, the gap between the curved surfaces 204g and 205g is almost uniform in the circumferential direction around the shading-plate-rotation shaft 31. Accordingly, the rotation of the shading plate 205 to the holding frame 204 is not obstructed. Incidentally, FIG. 12A shows a locus L of the front edge of the end 21 of the holding frame 204 over the full process of the rotation of the holding frame 204 around the holding-frame-rotation shaft 32. The front edge of the end 22 of the shading plate 205 did not exceed the locus L over the full process of the rotation of the holding frame 204, and is kept in the side of the holding-frame-rotation-shaft 32 (inner side) than the locus L. Accordingly, the arrangement area of the interchangeable lens unit 500 is not invaded.

According to the second embodiment, the first curved surface 204g of the end 21 of the holding frame 204 always overlaps with the second curved surface 205g of the end 22 of the shading plate 205 over the full process of the rotation of the holding frame 204 in the direction that intersects perpendicularly with the shading-plate-rotation shaft 31. This reduces the light leakage in the object-side end 21 of the holding frame 204. Accordingly, incidence of reverse entering light from the finder unit 113 into the image pickup device 302 is reduced in any position among the mirror-down position and the mirror-up position, and influence on the AE-AF operation or the photographing is reduced.

Moreover, since the curved surfaces 204g and 205g are convex and curve surfaces around the shading-plate-rotation shaft 31, the object-side ends of the holding frame 204 and the shading plate 205 are configured compactly. It should be noted that the convex-concave relation of the curved surfaces 204g and 205g may be inverted when only the reduction effect for the light leakage in the object-side end 21 of the holding frame 204 is taken into consideration. The curved surfaces 204g and 205g are not limited to the continuous circular surfaces. A curved surface may be a polygon surface that consists of a plurality of flat surfaces.

Moreover, the curved surfaces 204g and 205g are included in the approximately concentric circles around the shading-plate-rotation shaft 31. This reduces variation of the overlapping condition (gap) of the curved surfaces 204g and 205g depending on places during the rotation of the holding frame 204, which improves a shading effect.

Moreover, since the front edge of the end 22 of the shading plate 205 is kept within the range of the locus L of the front edge of the end 21 of the holding frame 204 over the full process of the rotation of the holding frame 204, the space is saved and the arrangement area of the interchangeable lens unit 500 is not invaded.

Moreover, since the extended portion 21a is provided in the end 21 of the holding frame 204, the thickness of the end 21 becomes thick and the rigidity of the holding frame 204 is improved. Moreover, since at least a part of the first curved surface 204g is formed in the extended portion 21a, the extended portion 21a serves also as the first curved surface 204g, which contributes to compactification.

The back side of the end 22 of the shading plate 205 is formed as a convex surface that is concentric with the second curved surface 205g in the second embodiment. However, this is an example and another configuration may be employed. A modified example about the configuration of the bottom surface of the end 22 will be described with reference to FIG. 15A and FIG. 15B.

Figure 15A:
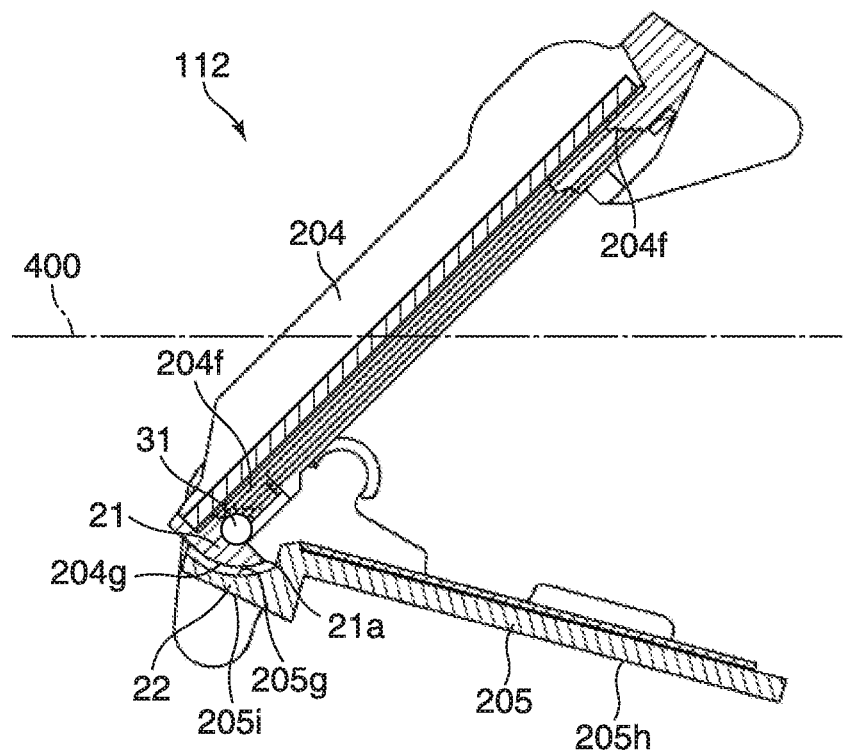
FIG. 15A and FIG. 15B are longitudinal sectional views of a mirror unit of a modified example of the second embodiment.
Figure 15B:
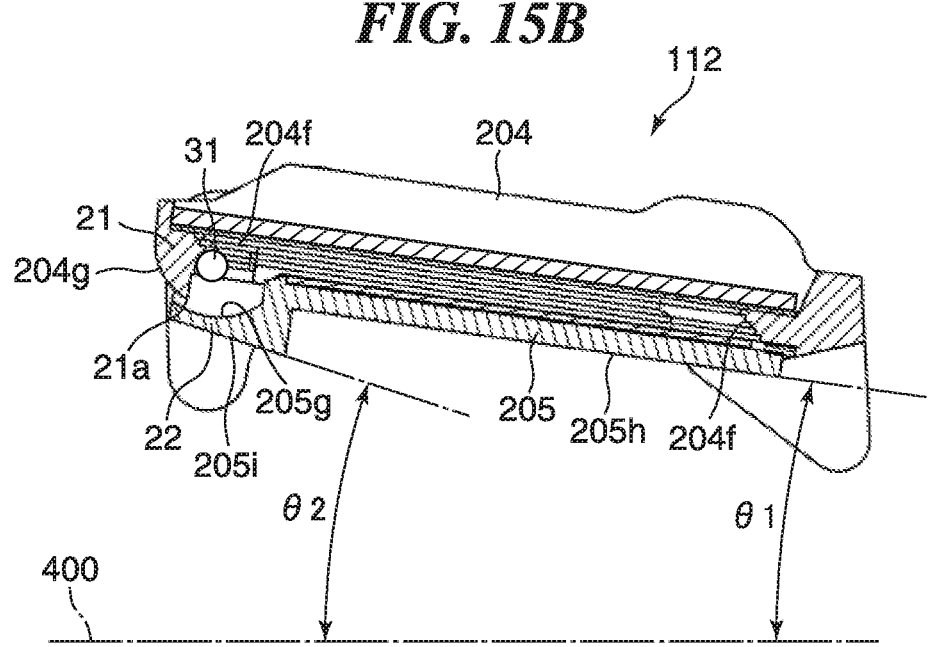

FIG. 15A and FIG. 15B are longitudinal sectional views of a mirror unit 112 of a modified example of the second embodiment, FIG. 15A shows a mirror-down state, and FIG. 15B shows a mirror-up state. The back side of the end 22 of the shading plate 205 is formed as a slant surface 205i. The other configurations are the same as that of the second embodiment. The remaining area other than the end 22 of the back side of the shading plate 205 is a flat main surface 205h. Although the slant surface 205i is also flat, its angle differs from the angle of the main surface 205h.

In the mirror-up state (FIG. 15B), the acute angle that is formed between the main surface 205h and the photographing optical axis 400 in a side view shall be an angle θ1, and the acute angle that is formed between the slant surface 205i and the photographing optical axis 400 shall be an angle θ2. The angle θ2 is larger than the angle θ1. The modified example shown in FIG. 15A and FIG. 15B reduces the unnecessary reflected light in the back side near the object-side end 21 of the holding frame 204 more efficiently as compared with the second embodiment.

It should be noted that the present invention is not limited to what has been described in the above-mentioned embodiment, quality of the material, shape, size, formation, the number of elements, arrangement locations, etc., can be changed suitably unless it is deviated from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Applications No. 2015-095591, filed May 8, 2015 and No. 2015-177545, filed Sep. 9, 2015, which are hereby incorporated by reference herein in their entireties.

What is claimed is:

1. An image pickup apparatus comprising:
a semi-transparent mirror;
a holding member that holds said semi-transparent mirror and is rotatably supported by a mirror box so as to move said semi-transparent mirror between a mirror-down position in which said semi-transparent mirror enters into a photographing light path and a mirror-up position in which said semi-transparent mirror is retracted from the photographing light path;
a drive unit configured to rotate said holding member between the mirror-down position and the mirror-up position;
a shading member that is supported on an object-side end of said holding member via a rotation shaft so as to rotate between a closed position that is close to said holding member and an opened position that is apart from said holding member;
an urging member that is arranged between said holding member and said shading member and that energizes said shading member in a direction to open said shading member to said holding member so as to arrange said shading member at the opened position when said holding member is in the mirror-down position; and an engagement portion that is provided in the mirror box and that engages with said shading member in a vicinity of the rotation shaft when said holding member rotates from the mirror-down position to the mirror-up position so as to rotate said shading member toward the closed position against an urging force of said urging member, and so as to arrange said shading member in the closed position when said holding member reaches the mirror-up position.

2. The image pickup apparatus according to claim 1, wherein said shading member is arranged in the closed position while covering said semi-transparent mirror when said holding member reaches the mirror-up position.

3. The image pickup apparatus according to claim 1, wherein the mirror box is equipped with a contact portion configured to contact said shading member when said holding member rotates to the mirror-down position.

4. The image pickup apparatus according to claim 1, wherein said shading member is formed so that a width at a distal end is narrower than a width at a proximal side at which the rotation shaft is arranged.

5. The image pickup apparatus according to claim 1, wherein antireflection portions are provided on both sides of said shading member.

6. The image pickup apparatus according to claim 1, wherein said holding member is arranged near the mirror-up position between the mirror-down position and the mirror-up position, and said shading member is arranged in the position that enters into the photographing light path in a state where said shading member opens from said holding member, when power of the image pickup apparatus is turned OFF.

7. An image pickup apparatus comprising:
a semi-transparent mirror;
a holding frame that holds said semi-transparent mirror so as to rotate said semi-transparent mirror between a mirror-down position in which object light is divided into an image pickup device and a finder optical system with said semi-transparent mirror and a mirror-up position in which said semi-transparent mirror is retracted from a photographing light path; and
a shading member that is rotatably supported via a rotation shaft provided on an object-side end of said holding member so as to be apart from said semi-transparent mirror when said holding frame is in the mirror-down position and to cover said semi-transparent mirror when said holding frame is in the mirror-up position,
wherein a first curved surface that has an approximately arc shape around the rotation shaft is formed in the object-side end of said holding frame,
wherein a second curved surface that has an approximately arc shape around the rotation shaft is formed in an object-side end of said shading member, and
wherein at least a part of the first curved surface overlaps with at least a part of the second curved surface in a direction that intersects perpendicularly with the rotation shaft over the full process of the rotation of said holding frame between the mirror-up position and the mirror-down position.

8. The image pickup apparatus according to claim 7, wherein the first curved surface is a convex surface, and the second curved surface is a concave surface.

9. The image pickup apparatus according to claim 7, wherein the first curved surface and the second curved surface are formed on approximately concentric circles around the rotation shaft.

10. The image pickup apparatus according to claim 7, wherein a front edge of the object-side end of said shading member is kept within a range of a locus of a front edge of the object-side end of said holding frame over the full process of the rotation of said holding frame between the mirror-up position and the mirror-down position.

11. The image pickup apparatus according to claim 7,
wherein said shading member has a first flat surface that is a main surface and a second flat surface that is formed in the object-side end on a back side of said shading member that does not face said holding frame in the mirror-up position, and
wherein an acute angle that is formed between the second flat surface and a photographing optical axis is larger than an acute angle that is formed between the first flat surface and the photographing optical axis when said holding frame is in the mirror-down position.

12. The image pickup apparatus according to claim 7, wherein the object-side end of said holding frame has an extended portion that is extended to the side facing said shading member in a thickness direction of said holding frame.

13. The image pickup apparatus according to claim 12, wherein at least a part of the first curved surface is formed on the extended portion.

* * * * *